(12) United States Patent
Litwin

(10) Patent No.: US 8,527,621 B2
(45) Date of Patent: Sep. 3, 2013

(54) AUTOLOGGING THE PRESENCE OF A WIRELESS LOCAL AREA NETWORK

(75) Inventor: Louis Robert Litwin, Planinsboro, NJ (US)

(73) Assignee: Thomson Licensing, Boulogne-Billcourt (FR)

(*) Notice: Subject to any disclaimer, the term of this patent is extended or adjusted under 35 U.S.C. 154(b) by 756 days.

(21) Appl. No.: 10/567,717

(22) PCT Filed: Aug. 22, 2003

(86) PCT No.: PCT/US03/26419
§ 371 (c)(1),
(2), (4) Date: Feb. 8, 2006

(87) PCT Pub. No.: WO2005/029344
PCT Pub. Date: Mar. 31, 2005

(65) Prior Publication Data
US 2006/0265491 A1    Nov. 23, 2006

(51) Int. Cl.
*G06F 15/16* (2006.01)
*G06F 15/173* (2006.01)

(52) U.S. Cl.
USPC ............ 709/224; 709/218; 709/223; 709/229

(58) Field of Classification Search
USPC ................. 709/218, 223, 229, 238, 245, 250, 709/200; 370/311, 355, 252, 338, 310; 455/456.1
See application file for complete search history.

(56) References Cited

U.S. PATENT DOCUMENTS

| 6,629,151 | B1* | 9/2003 | Bahl | 709/250 |
|---|---|---|---|---|
| 6,650,187 | B1* | 11/2003 | Riddle et al. | 331/17 |
| 7,110,783 | B2* | 9/2006 | Bahl et al. | 709/200 |
| 2002/0193090 | A1* | 12/2002 | Sugar et al. | 455/343 |
| 2003/0058808 | A1* | 3/2003 | Eaton et al. | 370/310 |
| 2003/0118015 | A1 | 6/2003 | Gunnarsson et al. | |
| 2003/0134650 | A1 | 7/2003 | Sundar et al. | |
| 2003/0156558 | A1* | 8/2003 | Cromer et al. | 709/238 |
| 2003/0174681 | A1* | 9/2003 | Gilberton et al. | 370/338 |
| 2003/0177267 | A1* | 9/2003 | Orava et al. | 709/245 |
| 2003/0185158 | A1* | 10/2003 | Lucas et al. | 370/252 |
| 2004/0003285 | A1* | 1/2004 | Whelan et al. | 713/201 |
| 2004/0068668 | A1* | 4/2004 | Lor et al. | 709/223 |
| 2004/0105434 | A1* | 6/2004 | Baw | 370/355 |
| 2004/0203872 | A1* | 10/2004 | Bajikar | 455/456.1 |
| 2004/0205158 | A1* | 10/2004 | Hsu | 709/218 |
| 2004/0264395 | A1* | 12/2004 | Rao | 370/311 |
| 2005/0021781 | A1* | 1/2005 | Sunder et al. | 709/229 |

OTHER PUBLICATIONS

The definition of "base station" from www.answers.com.*
Brandon Ogilvie, "Clock Solutions for WiFi (IEEE 802.11)", 2003, Application Note #70, pp. 1-4.*
Search Report dated Oct. 12, 2003.

* cited by examiner

*Primary Examiner* — Quang N Nguyen
(74) *Attorney, Agent, or Firm* — Robert D. Shedd

(57) ABSTRACT

A method includes scanning to detect presence of a wireless local area network WLAN, detecting presence of said wireless local area network, contacting a base station of said wireless local area network detected to request the location of said base station, and receiving location of said wireless area network.

18 Claims, 8 Drawing Sheets

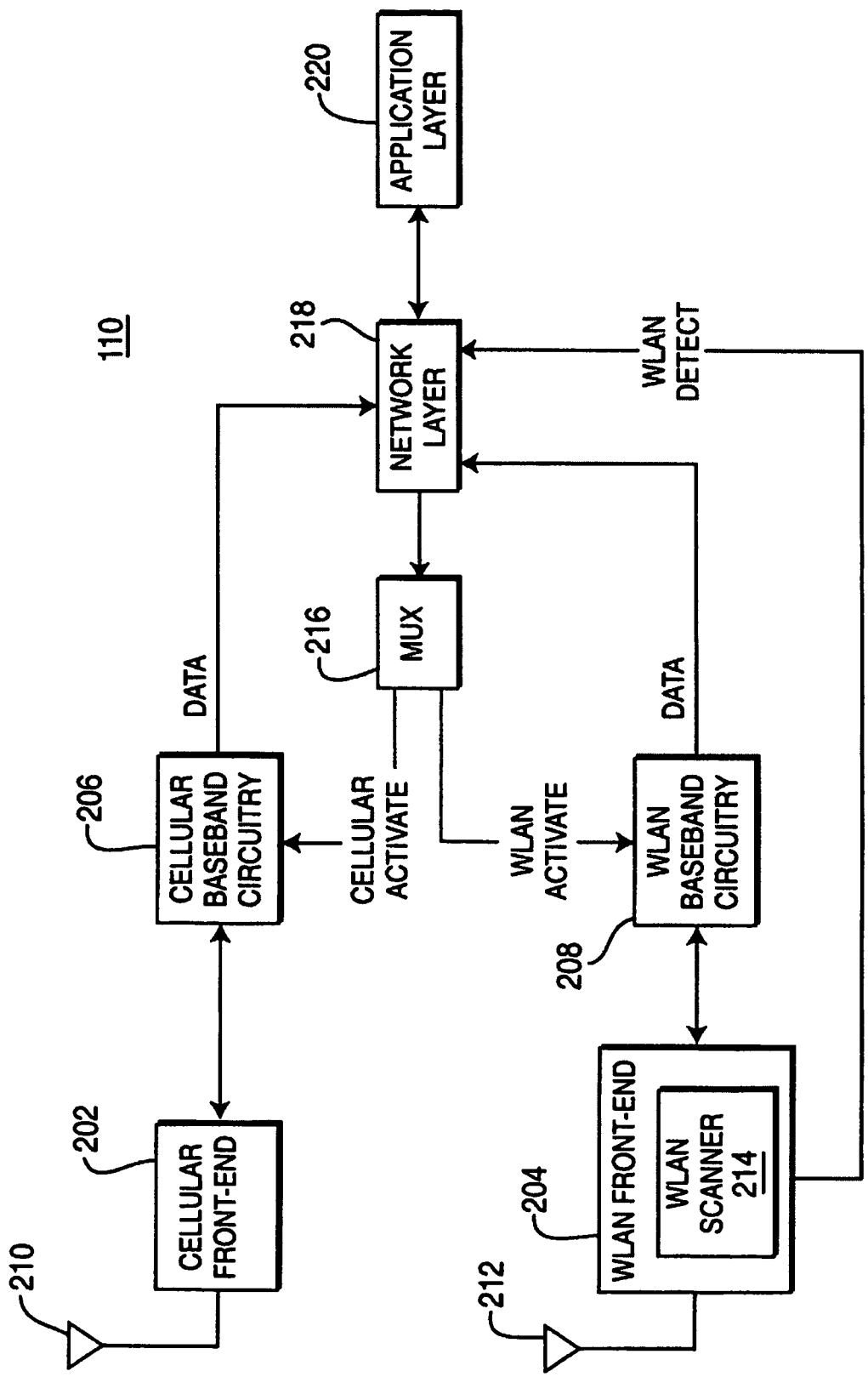

AUTOLOGGING THE PRESENCE OF A WIRELESS LOCAL AREA NETWORK

This application claims the benefit, under 35 U.S.C. §365 of International Application PCT/US03/26419, filed Aug. 22, 2003, which was published in accordance with PCT Article 21(2) on Mar. 31, 2005 in English.

BACKGROUND OF THE INVENTION

1. Field of the Invention

The present invention generally relates to communication systems and, more particularly, to a method and apparatus for automatically logging the presence of a wireless local area network.

2. Description of the Related Art

Presently, 2.5 generation (2.5G) and third generation (3G) cellular networks can provide wireless data service, such as wireless Internet service, having data rates up to 2 Mbps. On the other hand, wireless local area networks (WLANs), such as IEEE 802.11a, IEEE 802.11b, and HiperLAN/2 wireless networks, for example, can provide data service with rates higher than 10 Mbps. WLAN service is also typically cheaper to implement than cellular service due to the use of unlicensed frequency bands by WLANs. As such, it is desirable to switch from cellular service to WLAN service when a mobile device is within the service area of a WLAN. Switching between cellular service and WLAN service can provide for optimal utilization of the available spectrum, and can reduce the burden on cellular networks during times of peak activity.

Public wireless hotspots based on WLAN technology are becoming popular but users with wireless devices still face the challenge of determining where the hotspots are located. Mobile devices typically have limited power resources. Continuously checking for the presence of a WLAN by powering up a complete WLAN subsystem can result in considerable power drain. Thus, there is a need to minimize power used by mobile devices by automatically detecting and logging the location of wireless local area networks.

SUMMARY OF THE INVENTION

The present method includes scanning to detect the presence of a wireless local area network WLAN, detecting the presence of the wireless local area network, contacting a base station of the wireless local area network detected to request the location of the base station, and receiving the location of the wireless area network. Preferably, there is a logging of the location of the base station for future reference.

A wireless device is configured for scanning to detect the presence of a wireless local area network (WLAN), requesting a base station of the wireless local area network detected to transmit the location of the base station, and receiving and logging the location of the base station of the wireless area network.

A mobile device operable to communicate with a wireless communication network and a wireless local area network (WLAN) is configured for scanning to detect the presence of a wireless local area network (WLAN), detecting the presence of the wireless local area network, contacting a base station of the wireless local area network detected to request location of the base station, and receiving location of the wireless area network.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 2 depicts a high-level block diagram showing one embodiment of a portion of an exemplary mobile device of FIG. 1 having a wireless local area network (WLAN) scanner for use with the invention.

DETAILED DESCRIPTION

The present invention is a method and apparatus for automatically detecting and logging the location of wireless local area network (WLAN) locations, i.e., WLAN hotspots. If the automatic detection and logging feature is enabled, the mobile device searches for WLAN hotspots as the user moves. The inventive automatic logging of WLAN hotspots will be described within the context of scanning for WLAN hotspots by detecting energy fluctuations. Those skilled in the art, however, will appreciate that the inventive automatic logging of WLAN hotspots can be practiced with different WLAN scanning methods, such as detecting signature sequences unique to a WLAN and a position location system. Thus, the present invention has broad applicability beyond the WLAN detection method detailed herein.

Figure 1A:
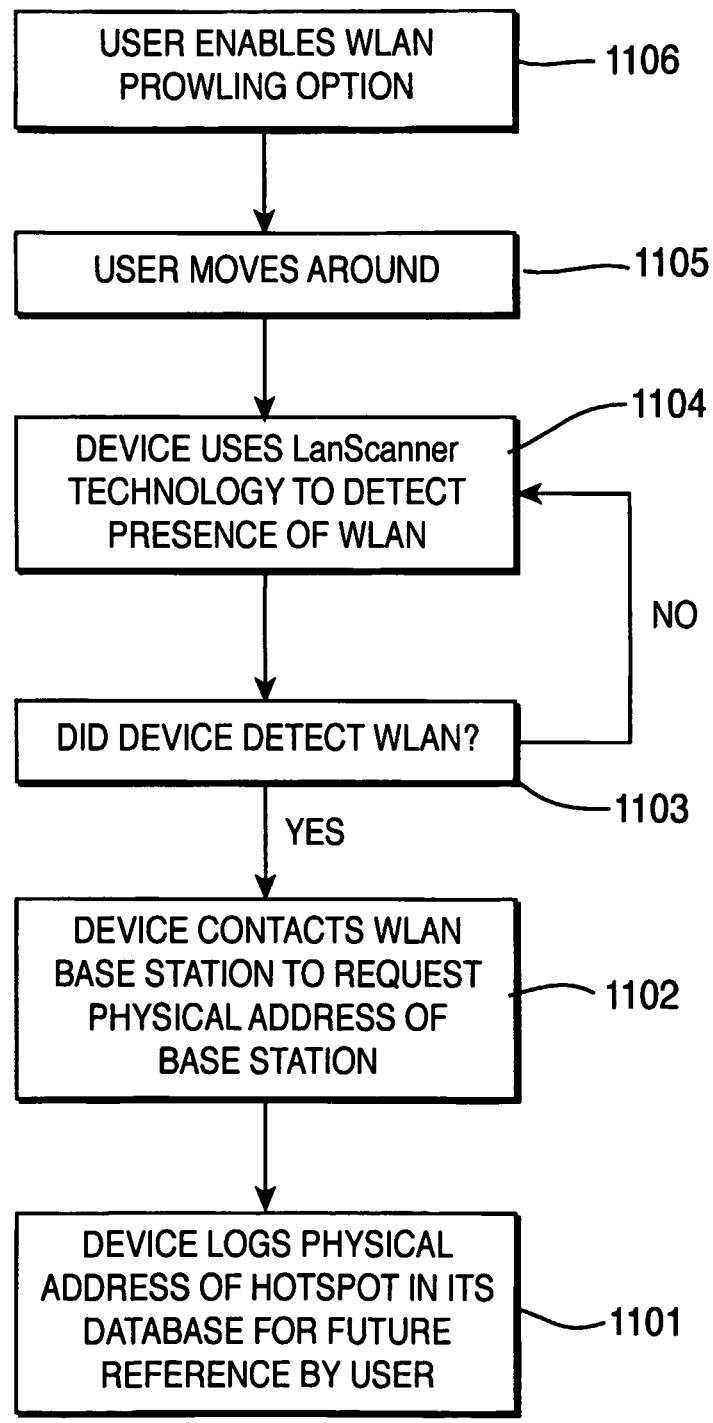
FIG. 1A a flow chart of an inventive automatic detection and logging of WLAN locations.

A high level block diagram 1100 of the inventive auto logging of WLAN locations is shown in FIG. 1A. Preferably, enabling a mobile device to automatically detect and log the location of local area networks is a user selectable option, also referred to herein as a WLAN Prowler option. The WLAN prowler option consumes extra battery power as the device searches for WLAN hotspots. The user can decide whether or not to turn it on. If the WLAN prowler option is enabled 1106, the mobile device searches for WLAN hotspots as the user moves 1105. Various methods can be used for scanning, i.e., searching, for WLAN hotspots 1104. If the mobile device detects the presence of a WLAN 1103, it will automatically turn on its WLAN transmitter and contact the WLAN base station 1102. Instead of contacting the base station to set up an actual connection, the mobile device will merely request that the base station send it a message containing the physical address of the base station. For example, the base station might send the device something like "Starbucks 731 $5^{th}$ Avenue, Manhattan, N.Y., USA". The device would then log this address in a database in its memory $110_1$. If the mobile device detects the base station's beacon and realizes that it is from a base station with a media access control identification MAC ID (a unique hardware identifier) that is already in the database, it will not query the base station since it already knows its location. Not querying base stations that are already in the locations database will reduce network traffic.

Later, the mobile device user can access the database and locate a WLAN hotspot near him. Alternatively, the user can type in his current address and the mobile device can search the database for the nearest hotspot. The device can also display the hotspot locations on an onscreen map. In an alternative embodiment, the mobile device user can also manually enter information. For example, if the mobile device user is somewhere in a city and getting a good signal, the mobile device user can enter his current location on a map for future reference. Alternatively, if the mobile device has a GPS receiver, the user can simply press a key or menu option and the device could automatically save its current location.

Figure 1B:
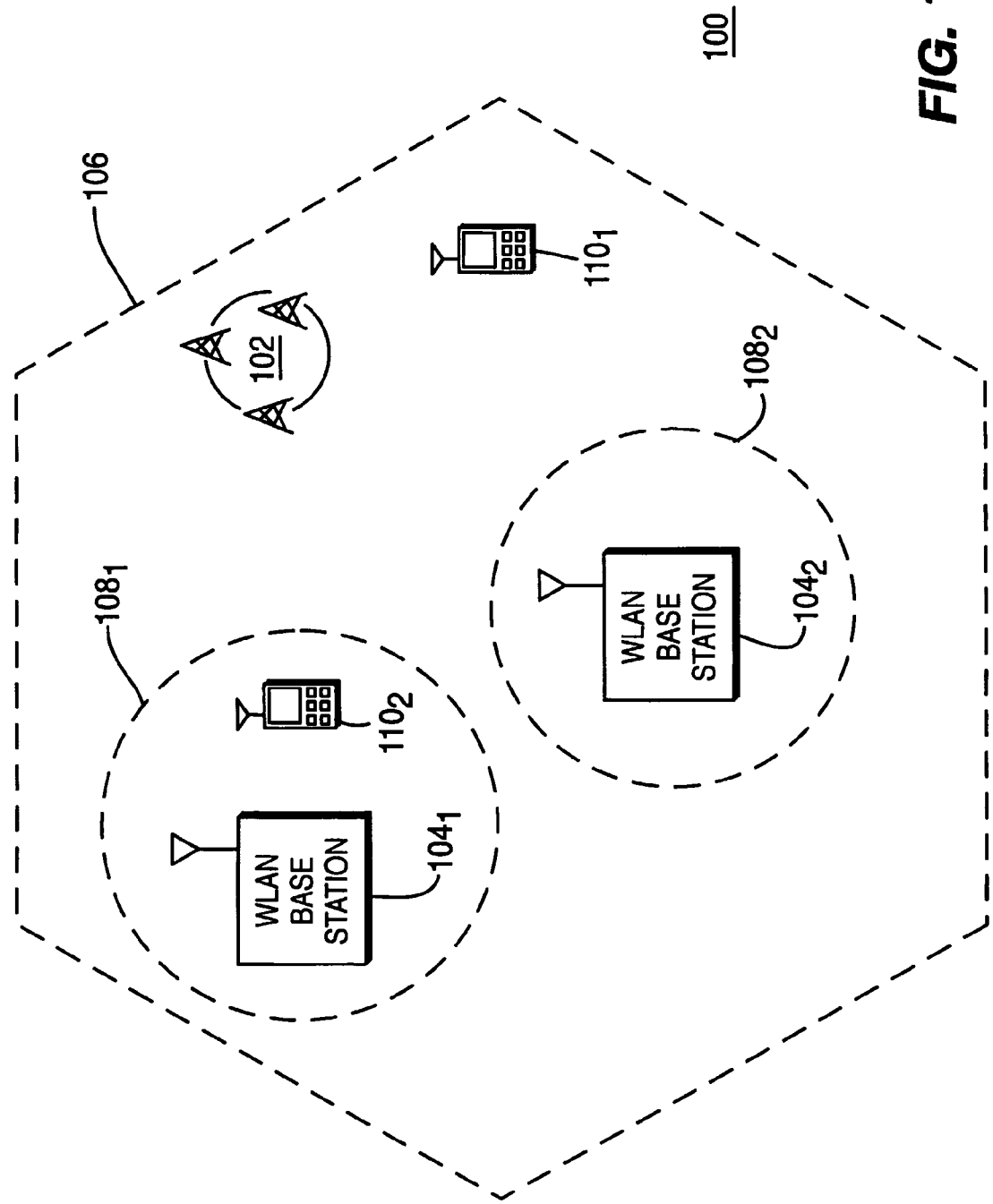
FIG. 1B depicts an exemplary communication system in which the present invention may be advantageously employed.

FIG. 1B depicts a communication system 100 in which the present invention may be advantageously employed. The communication system 100 comprises a wireless communication network 102, a plurality of WLAN access points 104 (e.g., WLAN access points $104_1$ and $104_2$), and a plurality of mobile devices 110 (e.g., mobile devices $110_1$ and $110_2$). The wireless communication network 102 provides service to mobile devices 110 located within a service area 106 (e.g., mobile devices $110_1$ and $110_2$). For example, the wireless communication network 102 can comprise a cellular telephone network providing voice and/or data services to mobile devices 110 within the service area 106. The WLAN access points $104_1$ and $104_2$ provide service to mobile devices 110 located within service areas $108_1$ and $108_2$, respectively (e.g., mobile device $110_2$ located within service area $108_1$). For example, the WLAN access points 104 can comprise IEEE 802.11b WLAN access points providing voice and/or data services to mobile devices 110 within the service areas 108. The communication system 100 is illustratively shown having non-overlapping service areas 108 corresponding to the WLAN access points 104 that are located with the service area 106 corresponding to the wireless communication network 102. Other arrangements can be used with the present invention, such as overlapping service areas 108.

As described below, the present invention allows each of the mobile devices 110 to detect the presence of a WLAN. As such, the present invention enables each of the mobile devices 110 to communicate with one or more of the WLAN access points 104, rather than the wireless communication network 102, when the mobile device 110 is located within the service areas 108. For example, mobile device $110_2$, which is located within service area $108_1$, is capable of communicating with WLAN access point $104_1$ and wireless communication system 102. Thus, mobile device $110_2$ can transfer communications between WLAN access point $104_1$ and wireless communication system 102 as desired. Mobile device $110_1$, however, will continue to communicate with the wireless communication system 102 until the mobile device $110_1$ moves within one or more of the service areas 108 of the WLAN access points 104.

The decision to switch between the wireless communication system 102 and the WLAN can be made at the mobile device 110 or by the intelligence in the wireless communication system 102. For the wireless communication system 102 to make the decision, the wireless communication system 102 requires precise knowledge of the location of the mobile device 110 and the location of the WLAN access points 104. The location of the mobile device 110 can be obtained precisely, for example, by using a Global Positioning System (GPS) receiver in the mobile device 110, and sending the coordinates to the wireless communication system 102.

FIG. 2 depicts a high-level block diagram showing one embodiment of a portion of a mobile device 110 in which the present invention is employed. The mobile device 110 comprises a cellular front end 202 coupled to an antenna 210, a WLAN front end 204 coupled to an antenna 212, cellular baseband circuitry 206, WLAN baseband circuitry 208, multiplexer 216, network layer 218, and application layer 220. Cellular front end 202 transmits and receives radio frequency (RF) signals in a cellular telephone frequency band, which are processed by the cellular baseband circuitry 206. WLAN front end 204 transmits and receives RF signals in a WLAN frequency band, which are processed by the WLAN baseband circuitry 208. The data outputs of the WLAN baseband circuitry 208 and the cellular baseband circuitry 206 are coupled to the network layer 218. The output of the network layer 218 is coupled to the application layer 220 for visual and/or audio display to a user. For example, the mobile device 110 can comprise a cellular telephone. In another example, the mobile device 110 comprises a personal digital assistant (PDA) with a WLAN plug-in card (e.g., a personal computer memory card internal association (PCMCIA) plug-in card).

The WLAN front end 204 includes a WLAN scanner 214 for detecting the presence of a WLAN. Briefly stated, the present invention initiates a WLAN scan to search for the presence of a WLAN. Methods for controllably performing a WLAN scan are described below with respect to FIGS. 9 and 10. Hitherto, the cellular front end 202 has been receiving and transmitting data signals, and the cellular baseband circuitry 206 has been processing the data signals. Upon detecting the presence of a WLAN, the WLAN scanner 214 notifies the network layer 218 that a WLAN is present. The network layer 218 can then activate the WLAN baseband circuitry 208 if desired through the multiplexer 216. That is, the WLAN front end 204 now receives and transmits data signals, and the WLAN baseband circuitry 208 processes the data signals.

When the WLAN baseband circuitry 208 is activated, the cellular baseband circuitry 206 can be deactivated. If the mobile device 110 thereafter moves outside the range of the WLAN, the network layer 218 can activate the cellular baseband circuitry 206 through the multiplexer 216, and the WLAN baseband circuitry 208 can be deactivated. In one embodiment, the network layer 218 activates the cellular baseband circuitry 206 in response to a decrease in the quality of signal at the mobile device 110 below a predetermined threshold (e.g., the mobile device 110 moves outside the range of the WLAN). Those skilled in the art will appreciate that the present invention can be used in other arrangements, such as a mobile device configured only to communicate with a WLAN (e.g., a laptop computer).

Figure 3:
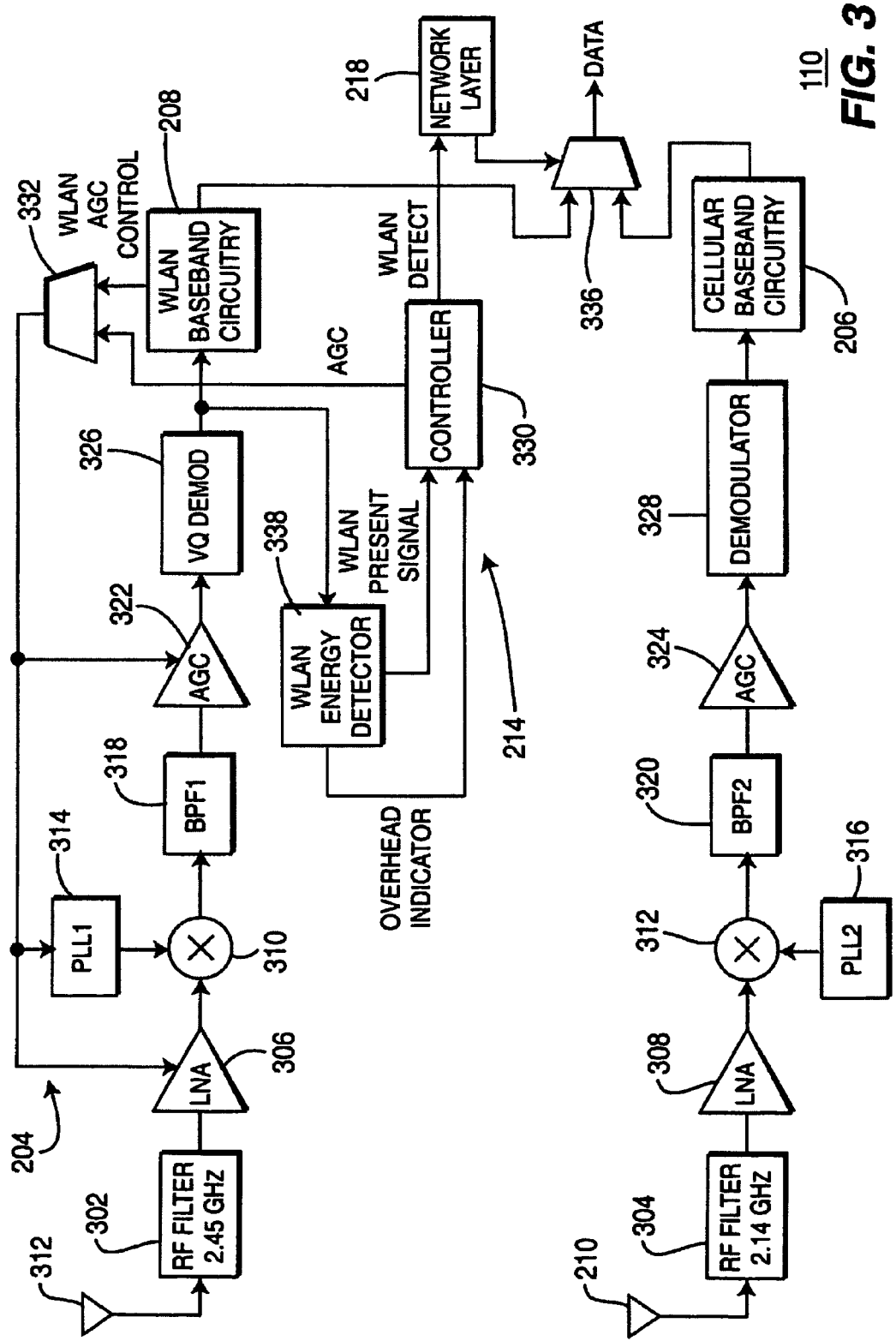
FIG. 3 is a more detailed block diagram showing the portion of the mobile device of FIG. 2.

FIG. 3 depicts a block diagram showing a more detailed embodiment of a portion of a mobile device 110 in accordance with the present invention. Elements in FIG. 3 that are the same or similar to elements in FIG. 2 are designated with identical reference numerals. The WLAN front end 204 illustratively comprises an RF filter 302, a low noise amplifier (LNA) 306, a mixer 310, a phase-locked loop (PLL) circuit 314, a band pass filter (BPF) 318, an automatic gain control (AGC) circuit 322, and an in-phase and quadrature (I/Q) demodulator 326. The cellular front end 202 illustratively comprises an RF filter 304, an LNA 306, a mixer 312, a PLL circuit 316, a BPF 320, an AGC circuit 324, and a demodulator 328. In the embodiment shown, the WLAN scanner 214 comprises a WLAN energy detector 338, a controller 330, a multiplexer 336, and an AGC multiplexer 332.

In operation, an RF signal propagating in a WLAN frequency band is coupled to the LNA 306 from the RF filter 302. The RF filter 302 is designed to pass RF signals in the WLAN frequency band of interest, for example, the 2.4 GHz range. The LNA 306 amplifies the RF signal under AGC control, and couples the RF signal to the mixer 310. The mixer 310 multiplies the RF signal with the output from the PLL circuit 314 to produce a tuned RF signal having a frequency associated with a particular channel of interest. The PLL circuit 314 is also under AGC control. The tuned RF signal is coupled to the BPF 318 to remove higher-order frequency components generated by the mixer 310. The output of the BPF 318 is coupled to the AGC circuit 322 for gain control. The output of the AGC circuit 322 is then coupled to the I/Q demodulator 326, which demodulates the tuned RF signal in a known manner. The output of the I/Q demodulator is a baseband or near baseband signal.

Operation of the cellular front end 202 is similar to that of the WLAN front end 204. Briefly stated, an RF signal propagating in a cellular frequency band is coupled to the LNA 308 from the RF filter 302. The RF filter 302 is designed to pass RF signals in a cellular frequency band of interest, for example, the 1.9 GHz range. The LNA 308 amplifies the RF signal, and the mixer 312 generates a tuned RF signal under control of the PLL 316. The BPF 320 removes the higher-order frequency components generated by the mixing process and the AGC circuit 324 provides gain control. The demodulator 328 outputs a baseband or near baseband signal to the cellular baseband circuitry 206.

The baseband or near baseband signal from the I/Q demodulator 326 is coupled to the WLAN energy detector 338. The WLAN energy detector 338 scans for one or more energy fluctuations in the demodulated RF signal that correspond to media access control (MAC) layer activity in a WLAN. Abrupt periodic changes in noise-like energy (e.g., energy fluctuations in the RF signal) will indicate activity resulting from medium access control (MAC) layer processes in WLANs. In one embodiment, the WLAN energy detector 338 scans for energy fluctuations that correspond to periodic beacons transmitted in the RF signal. For example, in IEEE 802.11 standards, beacons are periodically transmitted at a programmable rate (e.g., typically 10 Hz). Detecting the presence of these 10 Hz energy fluctuations in the RF signal can provide an indication of the presence of a WLAN.

In response to the detection of one or more energy fluctuations, the WLAN energy detector 338 indicates the presence of a WLAN to the controller 330. The controller 330 provides a WLAN detect signal to the network layer 218. The network layer 218 controllably selects the output signal from the WLAN baseband circuitry 208 through the multiplexer 336. A method of transferring communications in a mobile device from a cellular network to a WLAN is described below with respect to FIG. 4. The controller 330 also provides gain control for elements in the WLAN front end 204 through the AGC multiplexer 332 while the WLAN baseband circuitry 208 is not activated.

Figure 5:
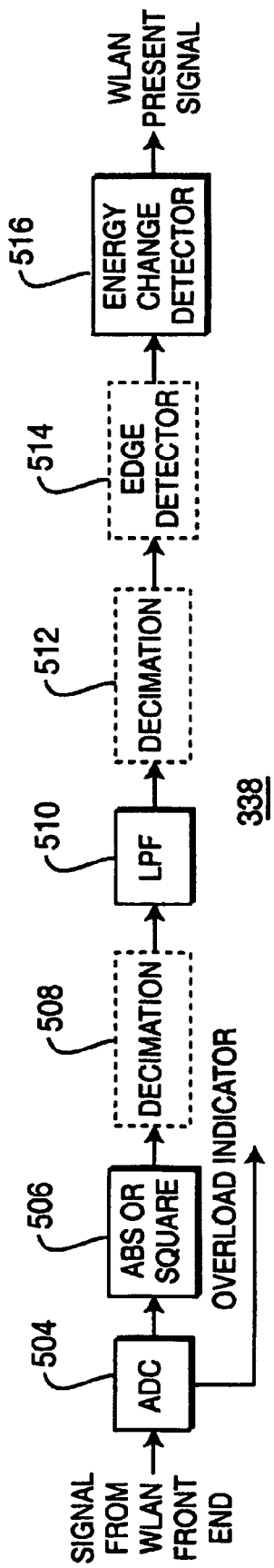
FIG. 5 depicts a block diagram showing one embodiment of an exemplary WLAN energy detector.

FIG. 5 depicts a block diagram showing one embodiment of the WLAN energy detector 338. The WLAN energy detector 338 comprises an analog-to-digital (A/D) converter 504, an absolute value circuit 506, a low pass filter (LPF) 510, and an energy change detector 516. The demodulated RF signal from the WLAN front end 204 is digitized by the A/D converter 504 and coupled to the absolute value circuit 506. The absolute value circuit 506 computes absolute values of the samples in the digitized demodulated RF signal. Alternatively, the absolute value circuit 506 can be replaced with a magnitude square circuit, which would square the samples of the digitized demodulated RF signal. The output of the absolute value circuit 506 is coupled to the LPF 510. The output of the LPF 510 is coupled to the energy change detector 516, which detects the energy fluctuations described above. Although the WLAN energy detector 338 is described as having an A/D converter, those skilled in the art will appreciate that the A/D converter can be in the WLAN front end 204, rather than in the WLAN energy detector 338. As described above, the demodulated RF signal can be a baseband or near baseband signal from the I/Q demodulator 326. Alternatively, the demodulated RF signal can be a low intermediate frequency (IF) signal typically used in systems that perform baseband demodulation in the digital domain. The pulse energy characteristic of the signal will be present in either approach.

Figure 7:
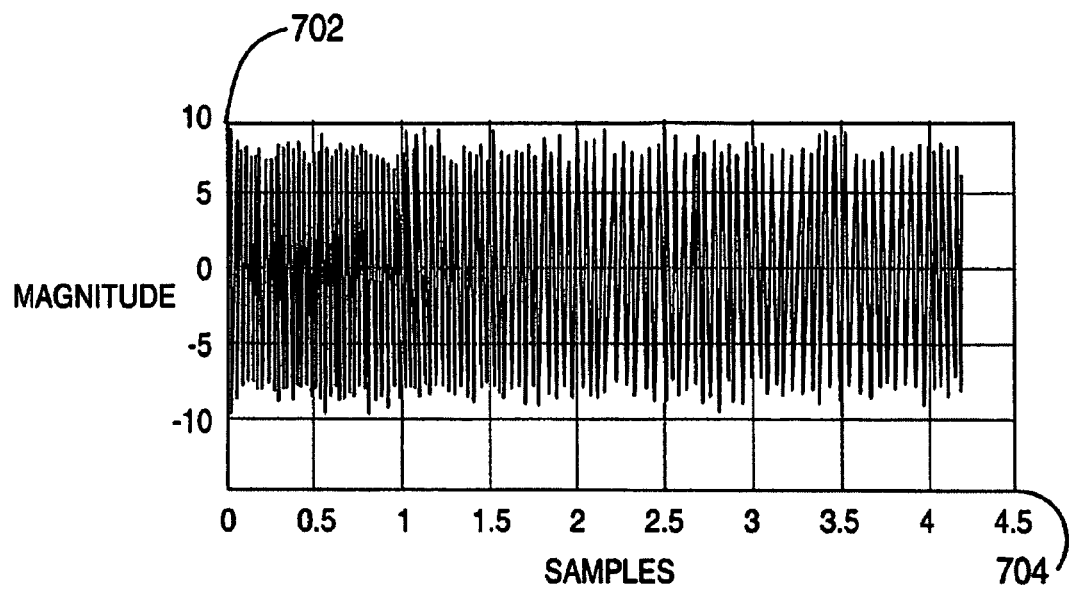
FIG. 7 graphically illustrates a received radio frequency signal from a WLAN.
Figure 8:
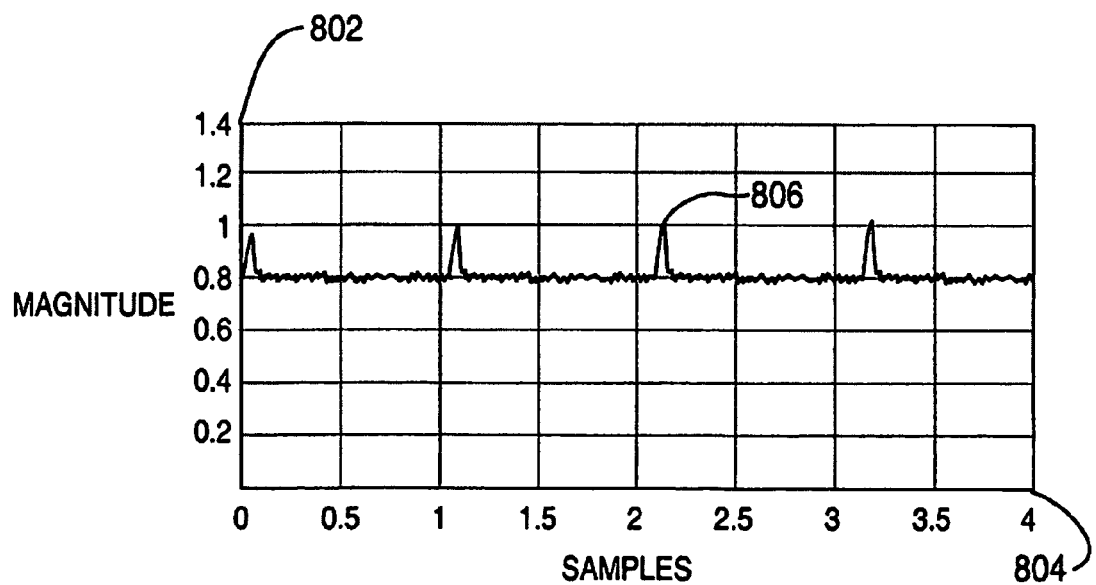
FIG. 8 graphically illustrates the RF signal of FIG. 7 filtered by the WLAN energy detector.

In operation, the WLAN energy detector 338 computes a recursive average of the absolute value or square of the demodulated RF signal from the WLAN front end 204. The result is shown graphically in FIGS. 7 and 8. In particular, FIG. 7 graphically illustrates a received RF signal. In the present example, the received RF signal is a direct sequence spread spectrum (DSSS) signal having a signal-to-noise ratio (SNR) of −3 dB. Such a signal is employed in an IEEE 802.11b WLAN, for example. Axis 702 represents the magnitude of the RF signal, and axis 704 represents the sample number in millions of samples. As shown, the RF signal is a signal having noise-like energy characteristics. FIG. 8 graphically illustrates the output of the LPF 510 in the WLAN energy detector 338 after the recursive average computation described above. Axis 802 represents the magnitude of the output signal, and axis 804 represents the sample number in millions of samples. As shown in FIG. 8, the output of the LPF 510 is a plurality of periodic energy pulses 806. The energy pulses 806 are an example of the one or more energy fluctuations resulting from MAC layer activity in a WLAN. The LPF 510 in the present example implements the following recursive average:

$$y(n)=x(n)+0.9999y(n-1)$$

where y(n) is the current output sample of the LPF 510, x(n) is the current input sample to the LPF 510, and y(n−1) is the previous output sample of the LPF 510.

To detect the energy pulses 806, the present invention employs the energy change detector 516. As described below with respect to FIG. 6, the energy change detector 516 detects the energy pulses 806 and generates a WLAN present signal to send to the controller 330. Since the present invention is only scanning for the presence of energy fluctuations in an RF signal, and is not recovering data from the RF signal, the present invention advantageously obviates the need to synchronize the RF signal and perform carrier recovery. The frequency reference accuracy specified in WLAN standards (e.g., ±25 ppm as specified in the IEEE 802.11b standard) can allow the PLL circuit 314 to operate without automatic frequency control (AFC) provided by the WLAN baseband circuitry. As such, the WLAN baseband circuitry 208 does not have to be activated to detect the presence of the WLAN, thereby conserving power and saving battery life in the mobile device.

The A/D converter 304 provides an overload indicator for controlling the gains of the LNA 306 and the AGC circuit 322 (FIG. 3) of the WLAN front end 204. The overload indicator is supplied to the controller 330 for avoiding the clipping effect into the A/D converter 504 that could cause erroneous signal detection. The controller 330 can employ the overload indicator to perform gain control through the multiplexer 332. Once the WLAN baseband circuitry 208 is activated, and the mobile device is receiving service from the WLAN, gain control is passed to the WLAN baseband circuitry 208 though the multiplexer 332.

Returning to FIG. 5, in another embodiment of the WLAN energy detector 338, decimation circuits 508 and 512 are provided at the input and output of the LPF 510. The decimation circuits 508 and 512 control the sampling rate, which can be adjusted depending on the SNR of the received RF signal. For example, if the SNR is high, the RF signal can be digitized at a lower rate. The noise energy will be aliased, but the energy pulses 806 will still be detectible. Thus, with 0 dB SNR, a 100:1 decimation of the LPF 510 input and output will still allow the energy pulses 806 to be detected by the energy change detector 516. On the other hand, if the SNR is low, higher sampling rates are used to allow more averaging in the LPF 510. In yet another embodiment, an edge detector 514 can be used to accentuate the rise and fall of the energy pulses 806 and to remove the DC offset produced by the LPF 510.

Figure 6:
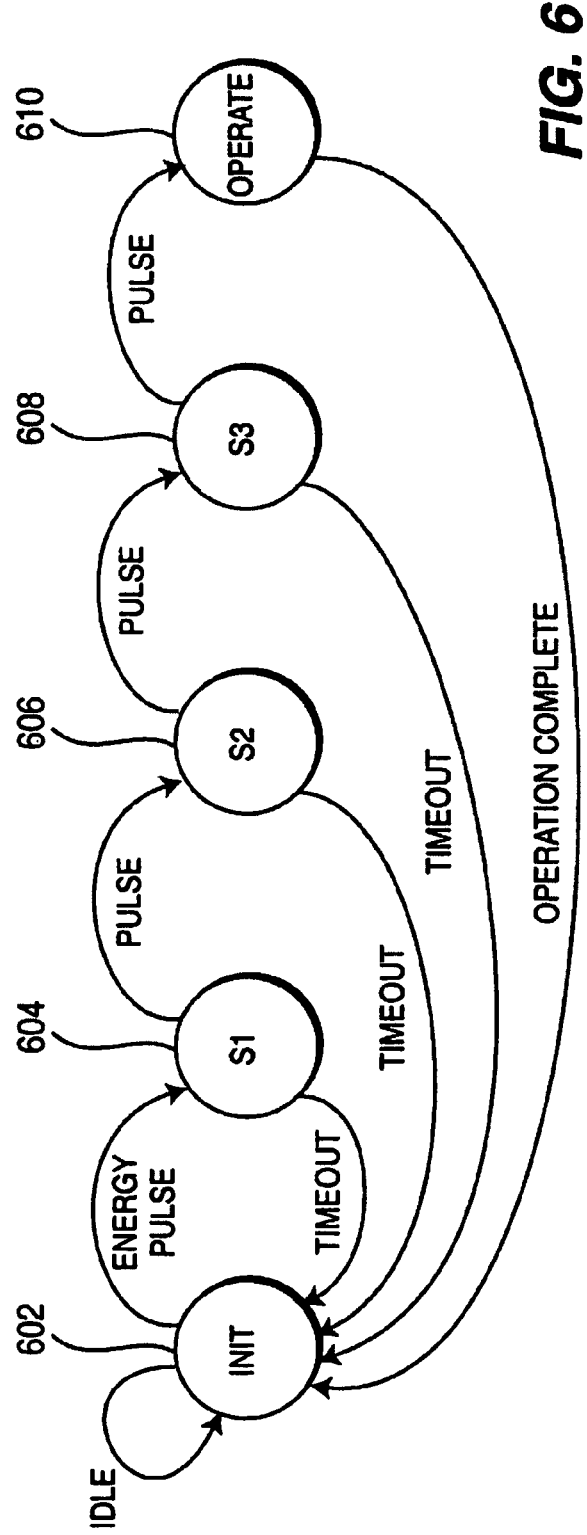
FIG. 6 depicts a state diagram showing an operation of the WLAN energy detector of FIG. 5.

FIG. 6 depicts a state diagram showing one embodiment of the energy change detector 516. In the present embodiment, the energy change detector 516 is a state machine operating at a frequency on the order of two times the MAC layer activity of the WLAN (e.g., 1 KHz). At state 602, the energy change detector 516 initializes. If there are no energy pulses 806, the energy change detector 516 remains idle. Upon the detection of one of the energy pulses 806, the energy change detector 516 moves to state 604. If another of the energy pulses 806 arrives within a predetermined duration, the energy change detector 516 moves to state 606. Otherwise, the energy change detector 516 returns to state 602. The energy change detector 516 proceeds from state 604 to states 606, 608, and 610 in a like manner. The predetermined duration can be implemented by a delay of a timer, for example, 150 ms. Thus, in the present example, four energy pulses 806 must be received within 150 ms before the energy change detector 516 indicates the presence of a WLAN. Those skilled in the art will appreciate that one or more states can be used corresponding to the detection of one or more energy pulses or fluctuations in the RF signal over a given duration.

Figure 4:
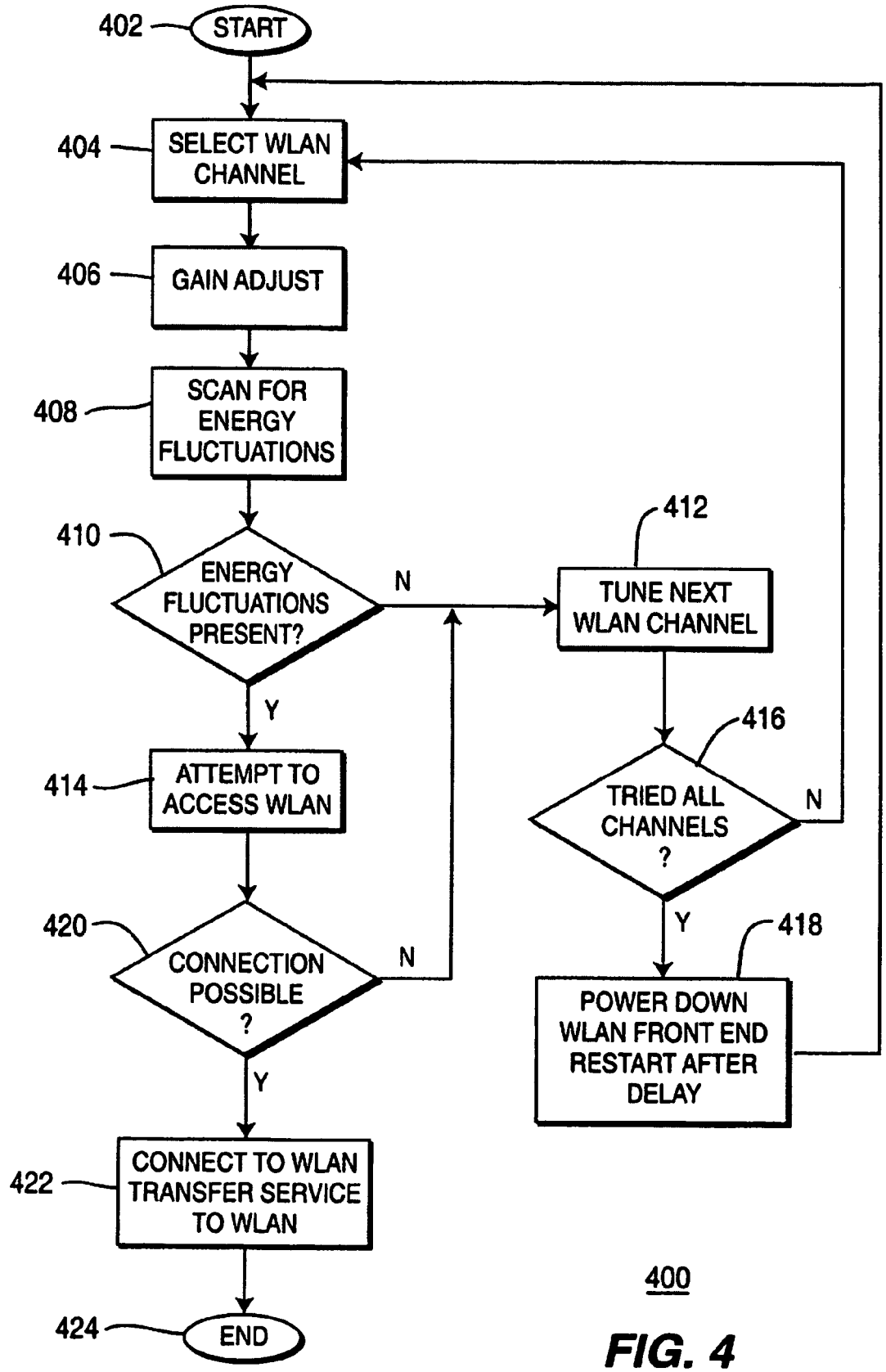
FIG. 4 depicts a flow diagram showing one embodiment of an exemplary method of transferring communications in a mobile device from a cellular network to a WLAN.

As described above, the WLAN energy detector of the present invention can allow a mobile device to transfer communications from a cellular network to a WLAN when the mobile device is located within the service area of the WLAN. FIG. 4 is a flow diagram showing one embodiment of a method 400 for transferring communications from a cellular network to a WLAN in a mobile device. The method 400 is best understood with simultaneous reference with FIG. 3. The method 400 begins at step 402, and proceeds to step 404, where the WLAN front end 204 selects a WLAN channel to process. Hitherto, the cellular front end 202 and the cellular baseband circuitry 206 are active, and the mobile device is communicating with a cellular network. At step 406, gain adjustment is performed as described above by the controller 330. At step 408, the WLAN scanner 214 scans for energy fluctuations as described above. If the WLAN scanner 214 detects such energy fluctuations, the method 400 proceeds from step 410 to step 414. Otherwise, the method 400 proceeds to step 412.

If the WLAN scanner 214 detects the presence of a WLAN, the WLAN baseband circuitry 208 is activated to determine the accessibility of the WLAN at step 414. If a connection is possible, the method 400 proceeds from step 420 to step 422, where the mobile device transfers communications from the cellular network to the WLAN. If a connection is not possible, the method proceeds from step 420 to step 412. The method 400 ends at step 424.

At step 412, the WLAN front end 204 selects the next WLAN channel to process. If there are no more channels to process, the method 400 proceeds from step 416 to step 418, where the WLAN front end 204 is deactivated and the method re-executed after a predetermined delay. If there are more channels to process, the method 400 proceeds to step 404, where the method 400 is re-executed as described above. The method 400 described above can be executed by the controller 330.

Figure 9:
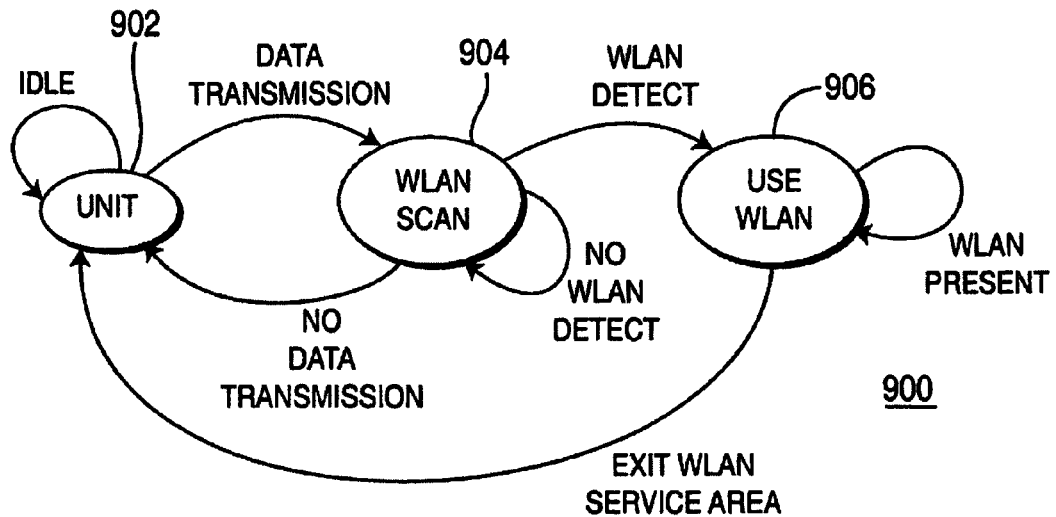
FIG. 9 depicts a state diagram showing one embodiment of an exemplary method for controllably performing a scan for a WLAN in a mobile device.

FIG. 9 depicts a state diagram showing one embodiment of a method 900 for controllably performing a scan for a WLAN in a mobile device. The method 900 begins at state 902, wherein the mobile device is initialized and remains idle. The method 900 proceeds to state 904 if the WLAN scanner 214 detects a data transmission by the mobile device. For example, the mobile device may begin to communicate with a cellular network, such as checking for electronic mail, or starting a web browser within the mobile device. Hitherto, the WLAN scanner 214 has been inactive. At state 904, the WLAN scanner 214 scans for a WLAN as described above. The WLAN scanner 214 continues to search for a WLAN until the mobile device ceases data transmission. If there is no data transmission by the mobile device, the method 900 returns to state 902, where the WLAN scanner 214 is inactive. If a WLAN is detected by the WLAN scanner 214, the method 900 proceeds to state 906, where the mobile device begins to use the WLAN, as described above. The mobile device continues to use the WLAN for as long as the mobile device is within the service area of the WLAN. Upon exiting the service area of the WLAN, the method 900 returns to state 902.

Figure 10:
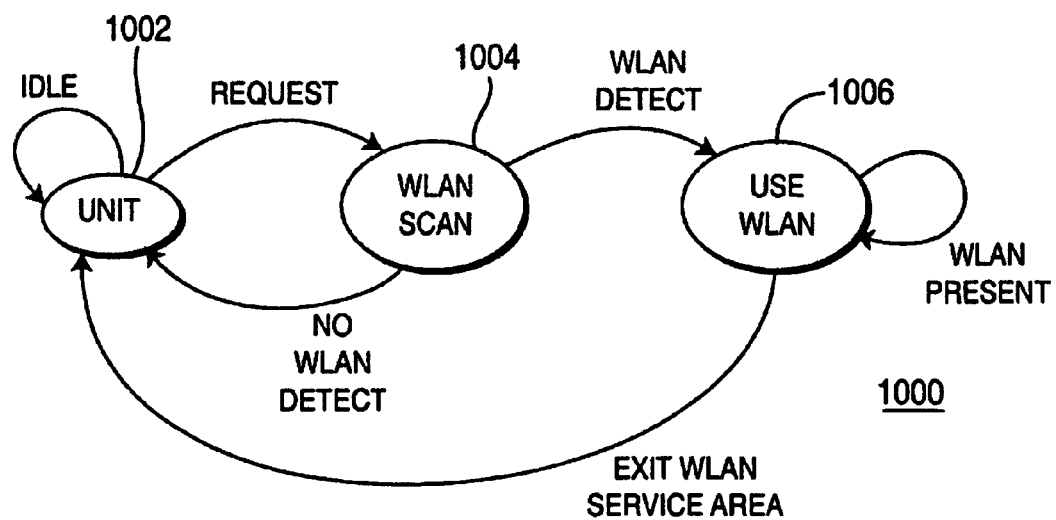
FIG. 10 depicts a state diagram showing another exemplary embodiment of a method for controllably performing a scan for a WLAN in a mobile device.

FIG. 10 depicts a state diagram showing another embodiment of a method 1000 for controllably performing a scan for a WLAN in a mobile device. The method 1000 begins a state 1002, wherein the mobile device is initialized and remains idle. The method 1000 proceeds to state 1004 if the WLAN scanner 214 detects a request from the mobile device to begin a WLAN scan. Hitherto, the WLAN scanner 214 has been inactive. For example, a user can manually request a WLAN scan by pushing a button on the mobile device, or by selecting a menu option, for example. This allows a user to only perform data transmission if the user can do so over a WLAN. If the cellular network is the only means of data transmission, the user can choose to forgo data transmission until such time as a WLAN service is available.

In another example, a user can set the frequency of WLAN scanning. That is, the WLAN scanner 214 can receive requests for a WLAN scan periodically or according to a fixed schedule. The frequency of WLAN scan can be a menu option within the mobile device, for example. Reducing the frequency of WLAN scanning conserves battery power in the mobile device, but introduces latency into the WLAN detection process, since the scanning will not occur as frequently. Increasing the frequency of WLAN scanning will result in quicker WLAN detection with attendant drawbacks in battery performance.

In yet another example, the request for WLAN scan can be generated by the user activating a WLAN scanning feature. Specifically, the mobile device can possess a WLAN scanning feature that be toggled on and off. If the WLAN scanning feature is toggled on, the request can be transmitted to the WLAN scanner 214 as a manual request or a periodic request. In addition, the WLAN scanning feature option can be used with the embodiment described above with respect to FIG. 9. A user could disable WLAN scanning when the user is making a data transmission, but knows that there is no WLAN coverage in the area (e.g., the user is in a car on the highway). Disabling the WLAN scanning feature conserves battery power.

In any case, at state 1004, the WLAN scanner 214 scans for a WLAN as described above. If a WLAN is not detected, the method 1000 returns to state 1002. If a WLAN is detected, the method 1000 proceeds to state 1004, wherein the mobile device begins to use the WLAN, as described above. The mobile device continues to use the WLAN for as long as the mobile device is within the service area of the WLAN. Upon exiting the service area of the WLAN, the method 1000 returns to state 1002.

While the foregoing is directed to the exemplary embodiment of the present invention, other and further embodiments of the invention may be devised without departing from the basic scope thereof, and the scope thereof is determined by the claims that follow.

The invention claimed is:

1. A method, comprising:
scanning to detect a presence of a wireless local area network;
detecting the presence of said wireless local area network;
determining a media access control identification of a base station of said wireless local area network;
comparing the media access control identification of said base station to a database of known locations of base stations of wireless local area networks and not requesting a location from said base station if the base station is in said database;
requesting and receiving a location of said base station through said wireless local area network if said base station is not in said database; and
logging the media access control identification of said base station and the received location in said database.

2. The method of claim 1, wherein said location comprises a map coordinate location of said base station.

3. The method of claim 1, wherein said location comprises one of a street address and longitude/latitude coordinates for said base station.

4. The method of claim 1, wherein said logging of said location is one of an automated logging and a manual logging.

5. The method according to claim 1, wherein said location comprises global position coordinates.

6. The method of claim 1, wherein said detecting comprises detecting signature sequences from a wireless local area network.

7. The method of claim 1, wherein said detecting comprises detecting energy fluctuations from said wireless local area network.

8. A wireless device comprising:
a processor coupled to a memory;
a means for scanning to detect a presence of a wireless local area network;
a means for detecting the presence of said wireless local area network;
a means for determining a media access control identification of a detected base station of said wireless local area network;
a means for comparing the media access control identification of said detected base station to a database of known locations of base stations of wireless local area networks and not requesting a location from said detected base station if the detected base station is in said database;
a means for requesting and receiving a location of said detected base station of said wireless local area network if said detected base station is not in said database; and
a means for logging the media access control identification of said detected base station and the received location in said database.

9. The wireless device of claim 8, wherein said location comprises a map location of said base station.

10. The wireless device of claim 8, wherein said location comprises a street address for said base station.

11. The wireless device of claim 8, wherein said location comprises global position coordinates.

12. The wireless device of claim 8, wherein said detecting comprises detection of an energy signature from said wireless local area network.

13. The wireless device of claim 8, further comprising the step of displaying a location of a base station of a wireless local area network logged previously that is near said wireless device.

14. A mobile device operable to communicate with a wireless communication network and a wireless local area network (WLAN), configured for carrying out the following steps:
scanning to detect a presence of a wireless local area network;
detecting the presence of said wireless local area network;
determining a media access control identification of a base station of said wireless local area network;
comparing the media access control identification of said base station to a database of known locations of base stations of wireless local area networks and not requesting a location from said base station if the base station is in said database;
requesting and receiving a location of said base station through said wireless local area network if said base station is not in said database; and
logging the media access control identification of said base station and the received location in said database.

15. The mobile device of claim 14, wherein said location comprises a map coordinate location of said base station.

16. The mobile device of claim 14, wherein said location comprises a street address for said base station.

17. The mobile device of claim 14, wherein said location comprises global position coordinates.

18. The mobile device of claim 14, further comprising displaying a location of a logged bases station of a wireless local area network near a location input by a user.

* * * * *